Apr. 17, 1923.
J. F. SIPE
1,452,099
ELASTIC TIRE AND METHOD OF MAKING SAME
Filed Nov. 2, 1920
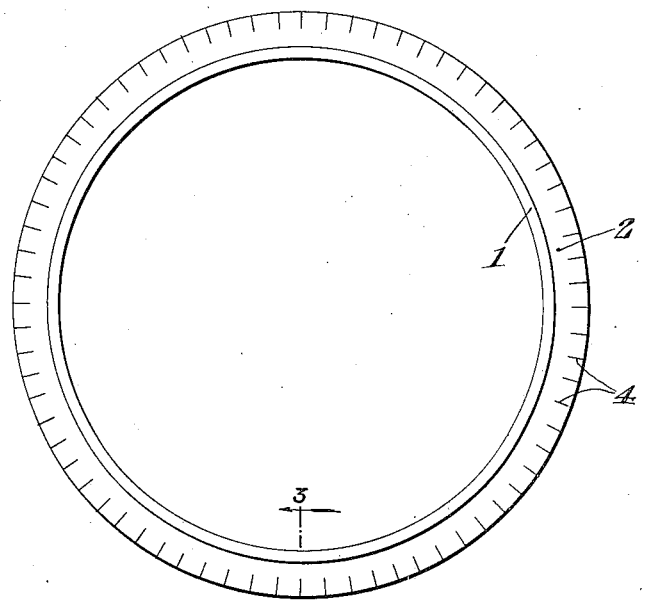
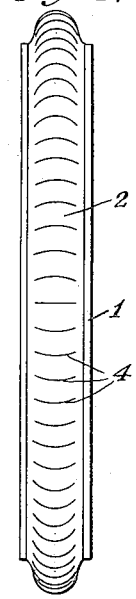
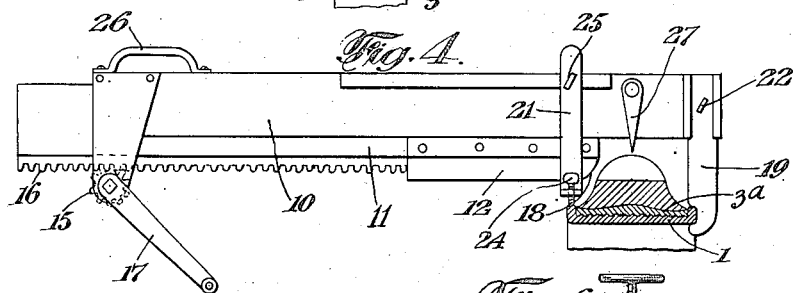
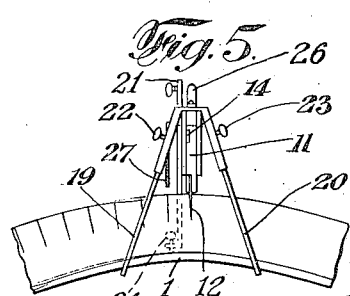
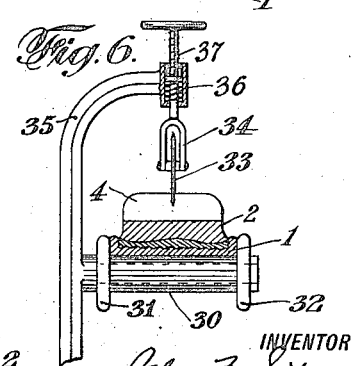
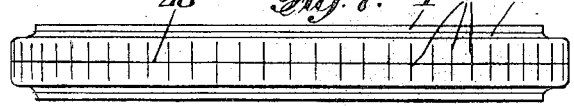

Patented Apr. 17, 1923.

1,452,099

UNITED STATES PATENT OFFICE.

JOHN F. SIPE, OF NEW YORK, N. Y.

ELASTIC TIRE AND METHOD OF MAKING SAME.

Application filed November 2, 1920. Serial No. 421,223.

*To all whom it may concern:*

Be it known that I, JOHN F. SIPE, a citizen of the United States, and resident of New York city, in the county and State of New York, have invented certain new and useful Improvements in Elastic Tires and Methods of Making Same, of which the following is a specification.

My invention relates to tires and more particularly to elastic tires and to a method for manufacturing the same.

The principal object of the invention is to improve at relatively low cost the cushioning, gripping and tractive qualities of a tire, while at the same time increasing its strength and wearing qualities. Other objects, advantages and features of the invention will appear more fully in the following specification and appended claims.

In order that my invention may be more fully understood attention is called to the accompanying drawing forming a part of this specification and illustrating solid tires embodying my invention. In the drawings, Fig. 1 is a side view of a tire embodying the invention; Fig. 2 is an end view of the same; Fig. 3 is a section taken on line 3—3 of Fig. 1; Fig. 4 is a side elevation illustrating one form of apparatus for practising the invention, the apparatus being shown in operative relation to a tire which is shown in cross section; Fig. 5 is an end view of the same; Fig. 6 is a side view of another form of apparatus in operative relation to another form of tire; and, Fig. 7 is a top view of the last named form of tire.

Referring to Figs. 1, 2, and 3, the tire comprises a ring 1, which is channel shaped in cross-section as shown in Fig. 3, and a resilient tire member 2 formed of rubber or other suitable elastic material and molded into the ring 1. As is common in the construction of tires, the member 2 is vulcanized in the ring 1 under a very high pressure, the bottom of the channel in the ring being serrated or otherwise roughened, as shown at 3 in Fig. 2, in order to cause the elastic member 2 to be more firmly secured to the ring 1. The member 2 comprises an inner portion $3^a$ which is very much harder than the outer portion of the said member.

After the tire member 2 is molded into the ring 1 as described above, I provide the outer or tread portion of the elastic member 2 with uniformly spaced transverse incisions or cuts 4. The distance between these cuts is such that a plurality of the sections which are thus formed between the adjacent cuts will always engage the road when the tire is in use. Good results can be obtained by making the spacing of the successive cuts or incisions, or, in other words, the length of the sections between successive cuts or incisions, from perhaps three-fourths of an inch to two inches, the spacing of the cuts or length of the sections increasing with the width of the tire. For a tire four inches wide, for example, a spacing of about one and one-half inches is advantageously employed, while for a very wide tire, say, fourteen inches, a larger spacing—for example, two inches—would be preferably employed. The incisions or cuts preferably would extend radially inwardly to equal depths from the tread or wear surface of the tire and terminate a substantial distance outwardly of the ring 1. The cuts or incisions, as shown, extend at right angles to the length of the tire.

With the construction described above, there is produced a tire in which the elastic member 2 comprises a continuous undivided base portion molded into and extending to a considerable extent outwardly of the ring 1 and a plurality of transverse relatively laterally movable sections arranged outwardly of and integral with the said base portion. These sections are tread sections of the tire, because the cuts or incisions have divided the tread surface thereof. This surface is, of course, that part of the tire which actually rests upon the ground. By tread sections I mean, therefore, sections whose outer surfaces are intended to actually rest upon the ground at least during the greater part of the normal life of the tire. In making the cuts or incisions none or substantially none of the material of the tire is sacrificed or removed so that the tire presents a continuous surface for wear. At the same time the various relatively movable sections in the tread portion of the tire are adapted to spread separately so as to compensate for high and low points of the road engaged by the tire, the portion of the tire engaged by the high points being free to spread or flow laterally much more easily than if the tire were not provided with the cuts or incisions. By reason of the continuity yet ready yielding of the tread portion of the tire, improved gripping and tractive qualities are obtained. I have found that my improved tire effectively prevents skidding. There is no space between adjacent relatively movable sections, the adjacent walls of the adjoining sections being in contact throughout. This has not only the advantage of leaving the tread of the tire continuous so as to produce good wearing qualities; but it also leaves no room for stones and other foreign matter to enter and become lodged between the sections, or for the high points of the road to enter and catch the individual sections and thereby damage the tire. Furthermore, in the case of a lateral blow the rubber or other elastic material is re-enforced by the sections adjoining the section or sections struck, inasmuch, as the rubber tends to flow in all directions when struck.

By extending the continuous base portion of the member 2 a substantial distance outwardly of the ring 1 excessive mushiness or softness of the tire is avoided and there is less liability of tearing off the yielding sections between the knife cuts. Satisfactory results are obtained if the cuts or incisions extend inwardly approximately half the distance from the outermost portion of the tire to the ring 1. The innermost portion of the cut or incision will then be a considerable distance outwardly of the very hard portion 4 of the elastic member 2. The construction described also had the advantage of making metal parts unnecessary and providing a very effective way of securing the elastic member 2 in place while producing the other advantages enumerated above. By cutting incisions in the tread portion of the tire in systematic arrangement and leaving a good body of the base portion uncut, thus liberating the rubber of the tread portion and allowing freedom of movement of one part in relation to another, there is produced a very active outer cushioning body which protects the base portion and which being integral with the base portion is in turn protected by it.

The tire described above may be made at a low cost. Figs. 4 to 6 show one form of apparatus by which the cuts or incisions 4 may be made in the tread portion of the tire. This apparatus comprises a frame 10 within which is reciprocally supported a slide 11 to one end of which is secured a knife 12. The slide 11 is held in proper position in the frame 10 by suitable means, such as the key 14. The slide and knife are reciprocated by suitable means, such as the pinion 15 mounted in frame and meshing with the rack 16 on the slide 11. The pinion 15 may be rotated by the crank 17. The forward end of the knife is curved as shown at 18 or otherwise suitably shaped to produce the desired cutting effect upon the material of the tire during reciprocation of the knife.

For holding the frame 10 in proper relation to the tire, the frame is provided at one end with two legs 19 and 20 adapted to hook upon one side of the ring 1 of the tire (see Figs. 4 and 5). A third leg 21 secured to the frame is adapted to bear upon the opposite side of the said ring. The legs 19 and 20 are mounted for vertical adjustment in guideways in the frame and they are secured in an adjustable position by suitable means such as the wing screws 22 and 23 respectively. The leg 21 is provided at its lower end with a wing screw 24 to permit vertical adjustment of the frame 10. This leg is also adjustable laterally upon the frame. A wing screw 25 serves to hold it in adjusted position upon the frame. By reason of the various adjustments referred to the apparatus is adapted for use with tires of different sizes and the depth of cut of the knife 12 may be readily controlled. A handle 26 may be used to assist in holding the apparatus in position. In order to facilitate the positioning of the apparatus so that the cuts or incisions will be spaced proper distances apart, the frame is provided at one side with a pointer 27 which is positioned over the last cut made in order to position the apparatus for the next cut. It will be seen that when the apparatus is in position, the knife 12 may be reciprocated to produce the desired cuts without the removal of material by rotation of the crank 17 first in a clockwise and then in an anticlockwise direction. The support holds the knife radially and at right angles with respect to the tire.

With wide tires it is sometimes desirable to provide a longitudinal or peripheral cut or incision 28 (see Figs. 6 and 7) in addition to the transverse cuts or incisions to permit freer yielding of the sections between the various incisions. There is thus produced, a series of rows of relatively movable tread sections. The cut or incision 28 is desirably of less depth than the cuts or incisions 4. Suitable apparatus for producing the longitudinal cut or incision 28 is shown in Fig. 6. Referring to this figure the tire is supported upon a roller 30 having at its ends flanges 31 and 32 which engage the sides of the ring 1 of the tire. A knife 33, which is preferably a rotary knife, is supported in a forked frame 34 which is movable vertically in the frame 35, the frame being held against rotation so as to maintain the knife 33 in the proper relation to the tire. The weight of the frame 34 and the knife 33 may be supported by a spring 36. The knife may be fed into the material by means of a screw 37 engaging the upper end of the support 34.

The apparatus described above is not claimed herein; but the right is reserved to file an application covering the same.

While I have shown certain forms of my invention it is to be understood that many changes may be made therein without departing from the spirit of my invention.

The tire may be incised or cut in an endless variety of ways and some or all of the benefits of my invention be derived. Any solid elastic tire vulcanized or molded into form by modern methods will be greatly improved by my invention. It is further to be understood that the invention is not limited to solid elastic tires but that other cushion tires may be greatly improved by my invention. Furthermore, whatever the shape of the tread surface of the tire, whether plain or not, the tire may be improved in the same way. By the term cut or incision without further qualification, I mean a division with substantially no material removed so that the adjacent surfaces of the blocks shall be practically in contact with each other.

What I claim as new, and desire to secure by Letters Patent is:

1. A tire including an undivided base portion and multiplicity of tread sections whose adjacent surfaces are normally in contact with each other.

2. A solid elastic tire having a continuous undivided base portion and a tread portion provided with a continuous wear or tread surface, said tread portion comprising relatively movable sections integral with the base portion and having their adjacent surfaces in contact.

3. A solid elastic tire having an undivided base portion and a tread portion comprising relatively movable transverse sections integral with the base portion and having their adjacent surfaces in contact, said sections being of a length to permit a plurality of them to always engage the ground.

4. A solid elastic tire having a continuous undivided base portion and a tread portion comprising relatively movable transverse sections integral with the base portion and having their adjacent surfaces in contact, said sections being of a uniform length no greater than one-half the width of the tire to permit a plurality of them to always engage the ground.

5. A tire comprising a channel shaped ring and a solid elastic member molded therein and projecting outwardly therefrom, said member having a continuous undivided base portion extending outwardly beyond said ring and a tread portion comprising relatively movable sections integral with the base portion and having their adjacent surfaces in contact.

6. A tire comprising a channel shaped ring and a solid rubber tire member vulcanized therein under pressure, said member having a continuous undivided base portion extending outwardly beyond said ring and tread portion comprising relatively movable transverse sections having their adjacent transverse surfaces in contact and said sections being of a length to permit a plurality of them to always engage the ground.

7. A tire comprising a channel shaped ring and a solid rubber tire member vulcanized therein under pressure, said member having a continuous undivided base portion extending outwardly beyond said ring and a tread portion provided with a continuous wear or tread surface, said tread portion comprising relatively movable transverse sections integral with said base portion and having adjacent contacting surfaces at right angles to the length of said member, said sections being of a uniform length no greater than one half the width of said member.

8. A solid elastic tire having cuts or incisions extending inwardly from its tread or wear surface, there being no substantial spaces produced by such cuts or incisions.

9. A tire comprising a channel shaped ring and a rubber tire member vulcanized in said ring under pressure and having an undivided base portion outside of said ring and of substantial depth and transverse cuts or incisions extending outwardly therefrom to its tread or wear surface, said cuts or incisions being spaced at distances to permit a plurality of the sections between the cuts to always engage the ground.

10. A tire provided with a multiplicity of substantially radial cuts or incisions formed without removal of any substantial material arranged all around the tire to permit small portions of the tire to separately yield.

11. A solid elastic tire having a continuously integral base portion of substantial depth and a tread portion provided with a series of incisions in systematic arrangement.

12. A tire having a continuous undivided base portion of substantial depth and a tread portion comprising a plurality of rows of relatively movable sections integral with the base portion and having their adjacent surfaces in contact.

13. A tire comprising a channel shaped ring, and a rubber tire member vulcanized in said ring under pressure and having transverse cuts or incisions extending inwardly from its tread or wear surface but terminating sufficiently far from said ring to leave a substantial depth of undivided base portion, said cuts or incisions being spaced at distances to permit a plurality of the sections between the cuts to always engage the ground, said member having also a longitudinal cut or incision whereby a plurality of rows of said section are formed.

14. A tire comprising a channel shaped ring and a rubber tire member vulcanized in said ring under pressure and having transverse cuts or incisions extending inwardly from its tread or wear surface but terminating sufficiently far from said ring to leave a substantial depth of undivided base portion, said cuts or incisions being spaced at distances to permit a plurality of the sections between the cuts to always engage the ground, said member having also a longitudinal cut or incision of less depth than said transverse cuts or incisions extending entirely around the tire.

15. A solid elastic tire provided with a multiplicity of cuts or incisions formed without removal of material all around the tire to permit small portions of the tire to separately yield.

16. The method of producing tires which consists in first forming the tire to shape and then subdividing its tread portion into a multiplicity of relatively movable ground engaging sections.

17. The method of producing a solid elastic tire which consists in forming the tire to shape and cutting substantially radial incisions in the tread portion thereof.

18. The method of forming a solid elastic tire which comprises molding the elastic material in and around a rigid channel shaped ring and thereafter cutting substantially radial incisions in the outer or tread portion of the elastic material without producing any substantial spaces in the material.

19. The method of forming a solid elastic tire which comprises molding the elastic material in and around a rigid channel shaped ring and thereafter cutting into the elastic material transverse incisions extending inwardly from the tread or wear surface of the tire and terminating sufficiently far from said ring to leave a substantial depth of undivided base portion.

20. The method of forming a solid elastic tire which comprises molding the elastic material in and around a rigid channel shaped ring and thereafter cutting into the elastic material at successive positions no further apart than one half the width of the tire, transverse incisions extending inwardly from the tread or wear surface of the tire and terminating sufficiently far from said ring to leave a substantial depth of undivided base portion and also a longitudinal incision extending entirely around the tire.

21. The method of improving a solid elastic tire which consists in cutting substantially radial incisions in the tread portion thereof without producing any substantial spaces in the material.

22. The method of improving any ordinary tire made of rubber compound which consists of making substantially radial incisions in the tread portion thereof in a systematic order so as to sever the material without removing any part thereof.

23. The method of improving a tire which consists in cutting substantially radial incisions in the tread portion thereof, leaving the blocks formed thereby in practical contact with one another.

24. The method of improving a tire having a rubber tread which consists of cutting substantially radial incisions in its wearing part without removing any substantial part thereof.

25. A rubber tread tire having a series of incisions made in its tread portion without substantial spaces produced by said incisions.

In testimony whereof, I have signed my name to this specification.

JOHN F. SIPE.